Jan. 6, 1959  G. A. HORSMAN  2,867,492
DEPTH SOUNDER KEYING AND WRITING APPARATUS
Filed March 28, 1957  3 Sheets-Sheet 1
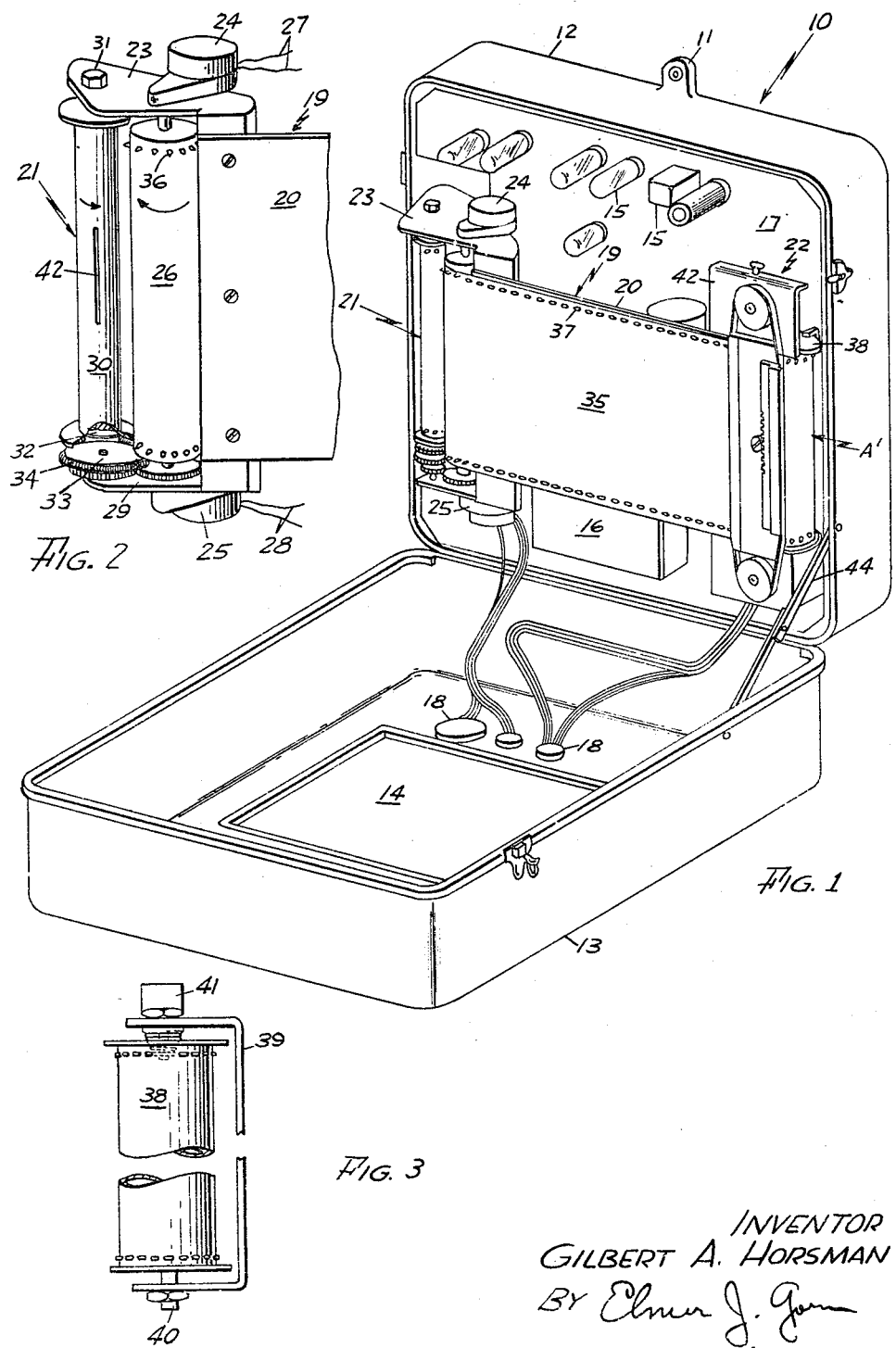
INVENTOR
GILBERT A. HORSMAN
BY Elmer J. Gorn
ATTORNEY Jan. 6, 1959 G. A. HORSMAN 2,867,492
DEPTH SOUNDER KEYING AND WRITING APPARATUS
Filed March 28, 1957 3 Sheets-Sheet 2
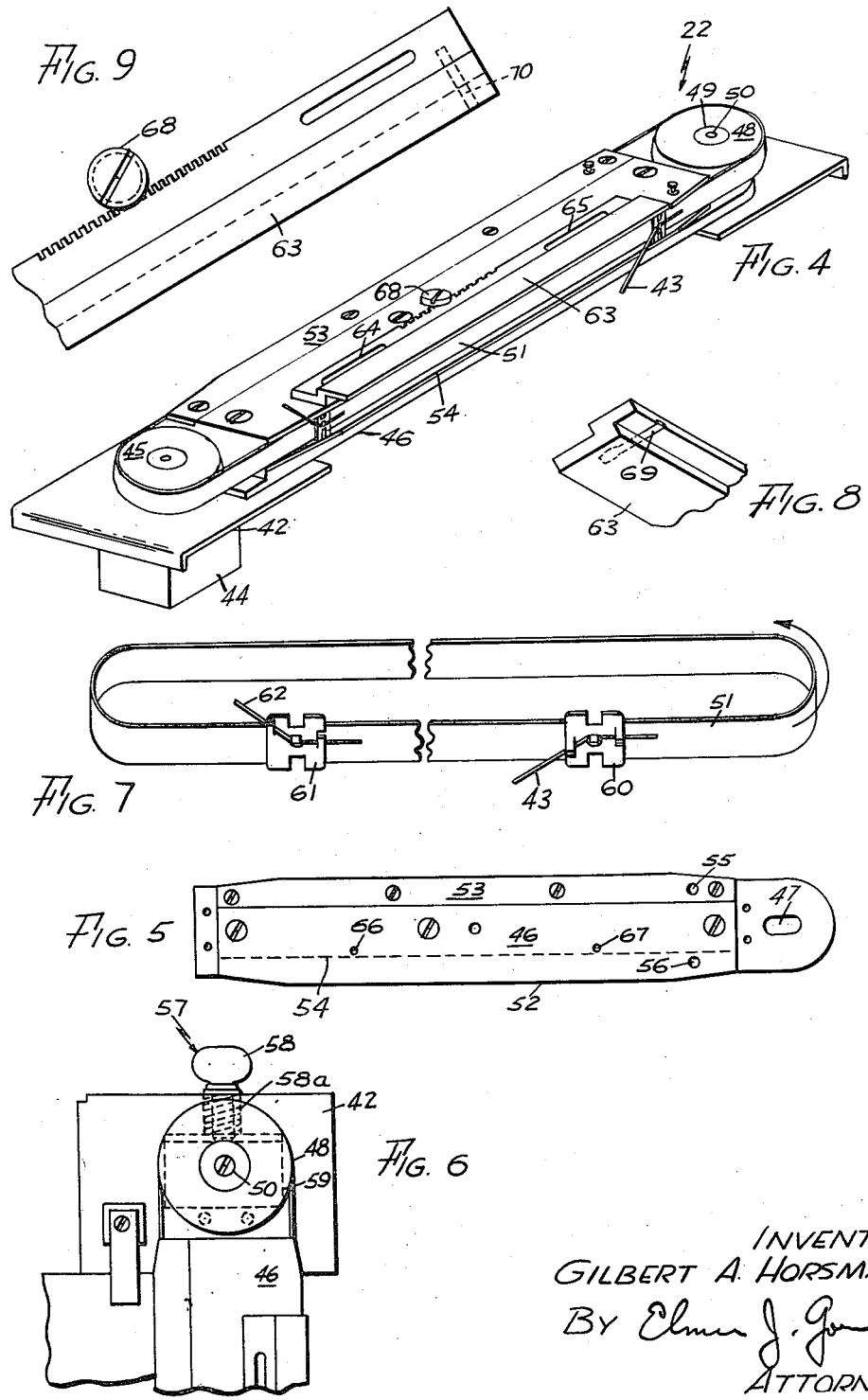
INVENTOR
GILBERT A. HORSMAN
BY Elmer J. Gorn
ATTORNEY

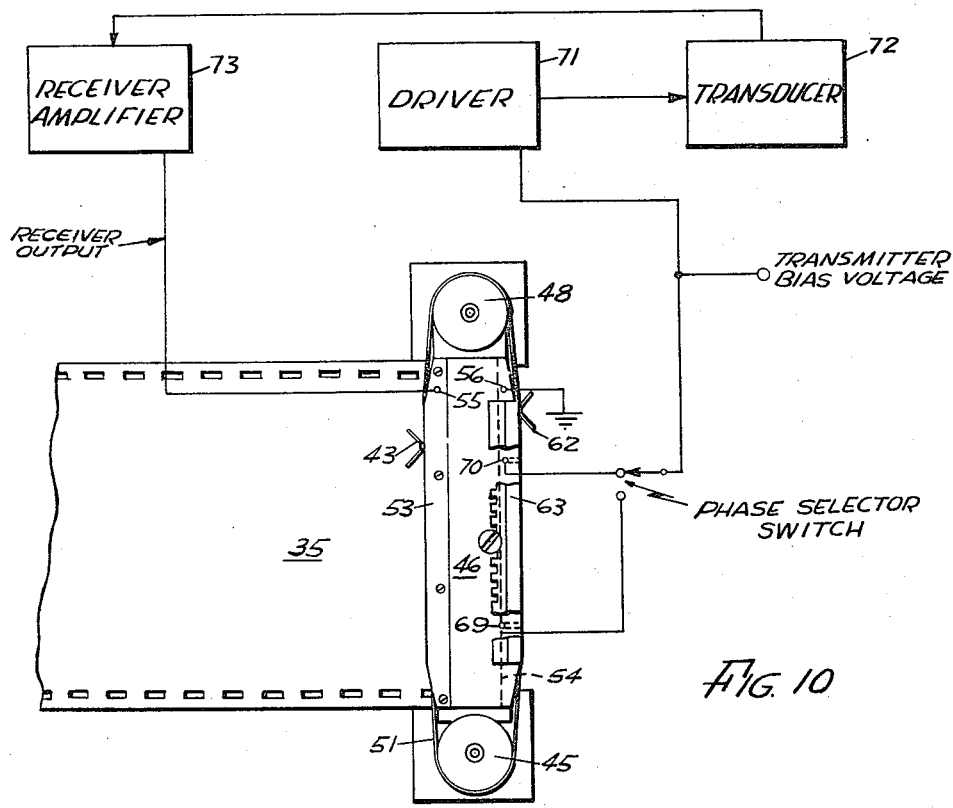

United States Patent Office 2,867,492
Patented Jan. 6, 1959

2,867,492

DEPTH SOUNDER KEYING AND WRITING APPARATUS

Gilbert A. Horsman, Sharon, Mass., assignor to Raytheon Manufacturing Company, Waltham, Mass., a corporation of Delaware Application March 28, 1957, Serial No. 649,207

11 Claims. (Cl. 346—74)

This invention relates to recording devices for pulse-echo depth sounding apparatus and, more particularly, to an apparatus for keying a depth sounder apparatus and for providing impulses of electric current representative of the depth of return echoes to a writing stylus for energization of a recording medium therewith.

The present invention is an improvement of the depth sounder recorder marking means disclosed in a patent to Fryklund No. 2,715,055. In accordance with the present invention, the keying and writing apparatus is integrally a part of a pulse-echo depth sounder apparatus, which may conveniently be housed in a portable carrying case. Included in the carrying case are the electrical components of the receiver and transmitter of said apparatus. The keying and writing assembly is electrically-connected to the receiver and transmitter and operates in conjunction with these portions of the apparatus for initiating the operation of said transmitter to emit sonic energy and for recording the instant of transmission and return echoes of said transmitted energy within a predetermined and selectable depth over the range of said apparatus. The keying and writing assembly is disposed in a manner to have a writing stylus thereof carry electrical impulse current for energization of a writing medium, graduated in depth markings, disposed in the path of said writing stylus.

The keying and writing stylii are rotated on an endless belt which is carried by a pair of pulley wheels. The pulley wheels are energizable at two preselected speeds in order to be able to record return echoes in either feet or fathoms as desired by the operator of the depth sounding apparatus. Said stylii are carried in carriers affixed to said belt, which are spaced a predetermined distance therebetween. Disposed in the path of each of said stylii is an electrically-conductive rail, which makes contact with one of said carriers over a portion of the rotational path of said carriers. The rails are individually connected to different electrical current sources. Thus, there is an electrically-conductive path from each rail to the corresponding stylii over a portion of the rotating path of said stylii. In addition, a pair of electrically-conductive members, which are electrically connected to a bias source which holds said transmitter nonconducting, are disposed in the path of only said keying stylus. The conductive members are selected to be electrically connected to the transmitter by a front panel switch. One of said conductive members is used for keying the transmitter for one phase or for one range of depths, while the other conductive member is concerned with a second phase or a second range of depths. For a first range of depths, beginning with zero depth, when the keying stylus contacts one of said conductive members, the transmitter is made operative and sonic energy is transmitted into the medium. Concurrently, with this instant, an impulse of electric current is furnished to the rail disposed in the path of the writing stylus, and the writing stylus is at zero depth on the writing medium for energizing said writing medium with said current. Thereafter, return echoes from said transmitted energy are fed to said writing rail and are conducted to the writing stylus over the first range of depths for said first phase. Since the writing medium is of the conventional type which is responsive to impulses of electric current, markings appear on said writing medium beginning with zero depth and for the depth of each return echo within said first range of depths. In a similar manner, return echoes from a second phase or second range of depths are recorded on said writing medium. In this mode of operation, when the keying stylus contacts said second conductive member, which is a fixed distance from said first conductive member, the writing stylus is delayed a predetermined period of time in order to reach the zero depth mark at a point in a time coincident with echoes returning from the beginning of said second range. The writing stylus, in contact with the writing rail, then has applied thereto impulses of electric current which are return echoes for the second range of depths.

Provision is also made for adjusting the relationship between said fixed stylii and said fixed conductive members in order to enable the marking of the first transmitted pulse of energy, and all return echoes thereafter, to be adjusted for zero depth coincident with the depth of the transducer or with the surface of the medium.

Heretofore, in recording apparatus for pulse-echo depth sounders, very often a single stylus is provided for keying and writing functions. In such apparatus, unless additional circuitry is included, necessarily, there is no means for writing during the keying period, and, thus, there is no recorded indication at zero depth of the instant of transmitting sonic energy. This disadvantage has been eliminated by the present invention wherein the writing and keying stylii are separated from each other and wherein each of said stylii performs a single function. In addition, while the present invention is also applicable to single phase apparatus, the invention lends itself well to multiple phase systems, since one or more conductive members may be disposed in the path of said rotating keying stylus in order to key and receive echoes from various depths. In this regard, since said conductive members are spaced by a predetermined distance, and said stylii are spaced by a predetermined distance, once said stylii are positioned properly with respect to said conductive members each time the transmitter is keyed, the writing stylus is in position for recording return echoes over the particular range selected for operation of the apparatus. Furthermore, the writing and keying apparatus of the present invention is also more rigid and less expensive to maintain because of the manner in which said writing stylii are carried on the endless belt. When the need arises, said stylii may be replaced individually, or if said belt requires replacement, it may be replaced readily and the relation between said stylii and said conductive members may be adjusted to have the proper coincidence between the keying of the transmitter and the position of the writing stylus on the writing medium. In addition, provision is made for having said belt rotate in a grooved guide bar so as to insure stability of the writing stylus in its path across the writing medium. Thus, the writing and keying apparatus of the present invention is an improvement on the apparatus described in said aforementioned patent.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Fig. 1 is a perspective view of the portable carrying case in which components of the transmitter and receiver of a pulse-echo depth sounding apparatus are housed, with the exception of the transducer which is connected via a connector (not shown) to said carrying case;

Fig. 2 is a perspective view of a portion of the platen assembly wherein a drive spool and a take-up spool are mounted;

Fig. 3 is a view taken along the line A' showing a feed spool secured in the base of the carrying case;

Fig. 4 is a perspective view of the keying and writing assembly secured to a mounting;

Fig. 5 is a plan view of a guide bar of the keying and writing assembly;

Fig. 6 is a plan view of a portion of the keying and writing assembly illustrating an adjustment for a pulley wheel mounted on the guide bar;

Fig. 7 is a perspective view of an endless belt with keying and writing carriers carried thereon and keying and writing stylii secured in said carriers;

Fig. 8 is a perspective view of a portion of a keying bar mounted on the guide bar and illustrating a conductive member embedded therein;

Fig. 9 is a plan view of the keying bar illustrating an adjustment screw for positioning the keying bar on the guide bar and also illustrating a second conductive member embedded therein; and Fig. 10 is an electrical diagram of a sonar apparatus wherein the keying and writing assembly is employed.

Referring now to Fig. 1, there is shown the rigid portable carrying case 10 opened to expose the components housed therein. A mounting lug 11 at the top of a base 12, and two others at the bottom thereof (not shown) are integrally formed as part of the metal base for suspending the entire case from a surface, such as a wall. A hinged cover 13 opens downward from the top of the base to permit access to the components therein. A window 14 in the cover enables the writing medium contained in the base to be observed. Electronic components such as tubes and transformers, designated by the reference symbol 15, comprise the transmitter and receiver of the pulse-echo depth sounder apparatus mounted in the base. Energizing voltages for the entire apparatus are applied to a single connector (not shown) but mounted on the base. A connector (also not shown), mounted alongside the voltage input connector, is provided for connecting the transducer of the depth sounder to the transmitter-receiver components. The power supply, a transformer of which is designated by the reference symbol 16, is also included in the base and mounted on a chassis 17 disposed therein. Said power supply may be conveniently designed to generate proper operating voltages for the apparatus for a plurality of different A. C. and D. C. input voltages. Front panel switches, secured to the cover, are designated by the reference symbol 18 and are functionally described in the subsequent description of the invention. A platen assembly 19 comprising a platen 20, a recording assembly 21 and a writing and keying assembly 22 is mounted in the chassis 17. The platen 20 comprises a flat metal surface, a portion of which is also shown in Fig. 2, which is secured to four posts (not shown) but disposed intermediate the undersurface of the platen and the chassis 17 of the apparatus included in the base. Components of the recording assembly are mounted on an extension bracket 23 affixed to the left side of the platen.

Motor and gear assemblies 24 and 25 of the recording assembly are secured to the top and bottom of the platen, at the left side thereof, for energizing a drive spool 26 vertically disposed in the extension bracket. Both motor and gear assemblies are energized by 115 volts A. C., which is connected to each pair of leads 27 and 28 connected thereto. The motor 24 rotates at 1/12 R. P. M., while the motor 25 rotates at 1/30 R. P. M., and a front panel switch is preferably wired into the electrical circuits of said motors for selecting the particular motor to be energized. The gear assemblies of said motors are energizably connected to the drive spool 26 for energization by the particular motor selected to be operated. As is described subsequently, the speed at which the drive spool is energized controls the rate at which a writing medium is drawn across the platen. A gear 29 is mounted on the bottom of the drive spool where said spool is attached to a shaft of the motor and gear assembly 25. This gear is energized when the drive spool is energized. Fig. 2 best shows the motor and gear assemblies and the spools energized thereby. The recording assembly is basically the same assembly described and illustrated in the aforementioned patent to Fryklund in that similar spools, driving mechanisms therefor, and securing hardware are employed although the spools themselves are positioned differently in the platen from that described in said aforementioned patent. Thus, only the distinguishable differences between the recording assembly herein and that described in said aforementioned patent will be described in detail. A take-up spool 30 is rotatably mounted to the left and to the rear of the drive spool. The spool has openings diametrically and centrally located at the ends thereof, as is conventionally used to fix a spool of this type in place. A spring-loaded pin 31 is mounted at the top of the platen for engaging an opening in the top of the spool. Sufficient pressure may be maintained on a take-up spool placed intermediate the spring-loaded pin and a stud integrally formed in the surface of a rotatably mounted pulley wheel 32, which is secured to the bottom of the platen. A gear and a pulley wheel 33 integrally formed as a unit are rotatably mounted adjacent the gear 29. The gear 33 is positioned so as to make contact with and be driven by the gear 29. A spring belt 34 is wound around the pulley wheels 32 and 33 so that when the gear 33 is rotated by the gear 29, the take-up spool is rotated in a direction opposite to that of the drive spool. As will be described subsequently, the writing medium 35 is drawn across the platen by sprockets 36 marginally located in the drive spool which mate with marginal holes 37 in the writing medium, so that the writing medium winds on said take-up spool. A feed spool 38, having wound thereon the writing medium, is clamped in place in a U-shaped bracket 39 provided therefor, which bracket is affixed to the chassis 17 behind the keying and writing assembly. The feed spool and bracket are best shown in Fig. 3. The feed spool has openings diametrically and centrally located in the ends thereof, as is conventionally employed, for attachment to a fixed stud 40 in the base thereof and for being held in place against said stud by a spring-loaded pin 41 affixed to the top arm of the bracket. The writing medium is drawn across the surface of the platen and its marginal holes are engaged with the protruding sprockets in the drive assembly. The lead edge of said writing medium is wound under and over the take-up spool and is inserted in a slot 42 in the longitudinal surface of said take-up spool for winding said writing medium on said take-up spool. The writing medium is preferably of the conventional type which is comprised of two layers, a nonconducting layer, having depth graduations thereon compatible with the range of the apparatus, and a conducting layer. Said conducting layer is in contact and adjacent to the platen. Said writing medium records a mark thereon in response to electric current flow from a source to the conducting layer. A writing stylus of the keying and writing assembly furnishes a current source to the writing medium to produce markings thereon.

The writing and keying assembly 22 is secured to the right side of the platen. Referring now to Figs. 1, 4 and 5, mounting 42, cut away so as to expose the feed spool, is positioned over the feed spool and is arranged in a manner to have a writing stylus 43, to be described more fully subsequently, move across the writing medium from top to bottom. As shown in Fig. 1, affixed to the bottom of the mounting is a two-speed motor 44 for regulating the rate of keying and writing. In one embodiment of the invention, wherein the range of the depth sounding apparatus for one phase is zero to one hundred feet and the range for a second phase is from ninety to one hundred ninety feet, and wherein it is desirable to switch from feet to fathoms when the depth in feet becomes an excessively large number, one motor speed was selected to be 1800 R. P. M., while the other was selected to be 300 R. P. M. The motor is energized by applying 115 volts A. C. thereto and a front panel switch 18 was wired into the electrical circuit of said motor to enable the speed of said motor to be preselected from the front panel. The shaft of said motor extends upward through an opening in the mounting 42 and has secured thereon a drive pulley wheel 45. A guide bar 46 is affixed to said mounting and is disposed vertically thereon, as is shown in Fig. 4. The guide bar shown in Fig. 5 has an opening 47 in the top surface thereof, which opening mates with an opening in the top of the mounting.

A follow-up pulley wheel 48, having ball bearings 49 centrally located therein and an opening for a securing pin 50, is rotatably affixed to the top of the guide bar. The pin 50 secures the follow-up wheel in place and is secured to the base. Shims (not shown) are placed intermediate the pulley wheel and the guide bar to raise said pulley wheel to the proper height above said guide bar and to facilitate its movement. Said pulley wheels are preferably fabricated from a rigid, nonmetallic material, such as thermosetting resin to provide electrical discontinuity between said wheels and said mounting 42. In addition, the use of a nonmetallic substance will assist in reducing wear attendant upon a belt 51 carried on said pulley wheels. In addition, said wheels are preferably slightly crowned to maintain the belt centered on said wheels during rotation.

The guide bar 46 is also preferably fabricated from an electrically nonconducting substance, such as a thermosetting resin. The longitudinal sides of the guide bar are preferably angled, as shown in Fig. 5, and have grooves longitudinally formed in edges thereof substantially between the angled portions. The grooves may be formed in the following manner, although other methods will immediately suggest themselves to persons skilled in the prior art. Initially, the guide bar may be fabricated from a thermosetting resin with an alternate edge on each surface thereof having the configuration designated by the reference symbol 52 in Fig. 5. Said edges are preferably raised uniformly above the sides of said guide bar. A pair of rails 53 and 54 may then be fabricated from a flat, electrically conductive metal having a surface thereof machined to match the configuration of said alternate guide bar surfaces. A rail is then affixed to each edge so as to slightly extend over the guide bar opposite the preformed edge. Naturally, the guide bar may be fabricated with depressions along said alternate sides for affixing said rails thereto flush with the surface of said guide bar. A contact 55 and 56 is connected to each of said rails for making electrical connections thereto. The belt 51 carried by said wheels is designed to ride in the space intermediate said preformed edges of the guide bar and the rail affixed thereto. The discussion given subsequently describes in detail other improvements cooperating with the disposition of the belt in the aforementioned manner.

The endless belt, fabricated from a substance which is preferably insulating and not elastic, is carried by the pulley wheels. A tension adjustment device 57 is affixed to the mounting 42 in order to adjust the distance between said pulley wheels, thereby enabling the proper tension to be exerted on the belt. As shown in Fig. 6, a wing nut 58 is threaded into an adjustment bar 59, which bar is also attached to the pin 50 holding the follow-up wheel in place. A spring 58a is carried on the wing nut 58 between the mounting and the adjustment bar. By adjusting the position of the wing nut in the bar, the follow-up wheel can be moved in the guide bar and, thus, can be positioned longitudinally in relation to the drive pulley wheel.

Referring now to Fig. 7, writing carrier 60 and a keying carrier 61 or slippers, fabricated from electrically-conductive material, are affixed to the belt by means of tabs which are clamped to said belt 51 and said carriers are spaced a predetermined distance therebetween. A writing stylus 43 and a keying stylus 62 fabricated from a material, such as piano wire, are affixed to said carriers, respectively. The stylii have a single loop integrally formed in the surface thereof for affixing said stylii to centrally-cut tabs in the surface of said carriers. A pair of oppositely-spaced tabs in the ends of each carrier are provided for securing the ends of each stylus in place. The writing stylus is positioned in the writing carrier in a manner to have the stylus point downward, while the keying stylus is positioned in the keying slipper to point upward. During the rotation of the belt, the angled portions of the guide bar facilitate the movement of the carriers on and off the rails disposed in their path.

Referring now to Figs. 4, 8 and 9, attached to the guide bar is a keying bar 63. As shown in Fig. 8, the keying bar is an S-shaped body fabricated from a nonconductive substance, such as a thermosetting resin. A pair of elongated openings 64 and 65 in the surface thereof are provided for mounting said keying bar and for positioning the keying bar on the guide bar. As shown in Fig. 5, holes 66 and 67 are used to secure the keying bar to the guide bar. As shown in Fig. 9, the outer side of the keying bar has a portion thereof, substantially equidistantly disposed from the ends thereof, with teeth therein. A geared adjustment screw 68 is provided and is secured in the guide bar for mating with the teeth on the keying bar. Adjustment of the geared screw positions the keying bar on said guide bar. In its normal position on the guide bar, the keying bar overhangs the edge of the guide bar and the keying rail disposed underneath said guide bar. As shown in Figs. 8 and 9, two conducting members 69 and 70 are preferably embedded or secured in the under surface of the overhanging edge of said keying bar in some manner well known in the prior art. These conductive members have electrical connections thereto for connection to the driver stage of the apparatus. During the rotational path of said carriers, the keying stylus makes contact with said conductive members on the keying bar while the keying carrier is in contact with and rides on the keying rail. Thus, an electrically-conductive path is provided between the keying rail and said conductive members as the keying stylus contacts said conductive members. In a similar manner, the writing carrier makes contact with and rides on the writing rail on the other side thereof of said guide bar and an electrically-conductive path is provided from the writing rail to the writing stylus. Furthermore, with the proper tension applied to the belt, said carriers are held in place against said rails and said belt rides in the grooved surface of the guide bar. In practice, it has been found that the writing stylus is stabilized and free from wobble as it traverses the writing medium due to the manner in which said belt is held in said groove by said carriers. Additionally, it has been found that the loop in said stylii prevents lateral movement of said stylii in said carriers due to pressure being exerted thereon by said conductive members and the writing medium. It should also be noted at this point that, in the event undue pressure is exerted on said stylii, said carriers will be maintained in contact with said rails, respectively, due to the particular arrangement of said rails on the guide bar.

In the embodiment of the depth sounding apparatus being described and shown in Fig. 10, the keying rail 54 was connected to a common ground potential while the conductive members 69 and 70 had connected thereto a negative bias voltage which kept a driver stage 71 of the transmitter of the apparatus inoperative. One conductive member was electrically connected to the driver stage depending on the phase or range of operation selected by energizing a front panel phase selector switch. The driver stage 71 was keyed whenever the keying stylus 43 contacted the particular conductive member in the circuit and short-circuited the bias voltage holding the driver stage inoperative. As expected, it was found that a positive voltage of the proper magnitude could be substituted for the common ground applied to the keying rail. Provision was also made for recording the instant of transmission during the first phase or first range of zero to one hundred feet by energization of said writing medium coincident with zero depth or a preferred equivalent thereof. To this end, the contact 70 keyed the driver stage for the first phase and the spacing between the keying stylus 62 and the leading writing stylus 43 was such that said writing stylus was coincident with zero depth on said writing medium. The rail 53 was electrically connected via the contact 55 to a receiver amplifier 73 of the transducer and at the instant of transmission an impulse of current was available for energizing the writing medium. Thereafter, as the writing stylus traversed the writing medium, impulses of electric current for all return echoes occurring within the first phase of operation were available for marking said medium.

In a similar manner, the second contact 69 was employed for recording return echoes between ninety feet and one hundred ninety feet, and, therefore, it was displaced from said first contact by a fixed distance. Thus, with a fixed spacing between said conductive members, when the keying stylus 62 keyed the transmitter by contacting said contact 69, the writing stylus 43 required a longer period to reach the zero-depth mark on said writing medium in order to record return echoes beginning with ninety feet. Similarly, in the second phase, with said writing rail connected to the output of the receiver amplifier, return echoes between ninety and one hundred ninety feet were recorded as the writing stylus traversed the writing medium.

By means of a front panel switch, the motor 44 was rotated at 300 R. P. M. which decreased the speed of rotation of the belt to such a degree that return echoes were recorded in fathoms rather than feet. The speeds selected for the rotation of said keying and writing assembly were determined in part by the overall ranges of the apparatus, the size of the writing medium for recording return echoes occurring within said ranges and the overall dimensions of the writing and keying assembly for the apparatus.

Having described one embodiment of a depth sounding apparatus to which the present invention is applicable, the applicant realizes that many modifications thereof will suggest themselves to persons skilled in the prior art. For example, said writing and keying apparatus is applicable to single or multiple phase pulse-echo depth sounding apparatus employing one or more transducers as the transmitting and receiving element. In addition, a cable rather than a belt can be substituted for carrying said stylii, and certainly other speeds for rotating said stylii and said writing medium can be used, depending on the apparatus used in conjunction therewith; and, furthermore, other and various voltages may be applied to the electrically-conductive rails and members described herein for obtaining a desired result at predetermined periods of time by the rotation of said stylii. Thus, the invention is not limited to the particular details of construction or voltages employed as many equivalents and uses of the apparatus will suggest themselves to persons skilled in the prior art. Accordingly, it is desired that the appended claims be given a broad interpretation commensurate with the scope of the invention within the art.

What is claimed is:

1. A keying and writing apparatus comprising in combination a pair of pulley wheels, an endless belt carried by said wheels, means for rotating said belt by rotatably energizing said wheels, electrically-conductive stylii carried by said belt and spaced a fixed distance apart, an electrically-conductive member disposed in the rotational path of said stylii and in contact with each one of said stylii over a portion of their rotational path, an electrically-conductive contact disposed in the path of one of said stylii over a portion of its rotating path, said contact being electrically short-circuited to said conductive member during the rotational path of one of said stylii, and the other of said stylii being electrically connected to said member at a predetermined position thereon at the instant of said short circuit and for a predetermined period thereafter during its rotational path.

2. A keying and writing apparatus comprising in combination a pair of pulley wheels, an endless belt carried by said wheels, means for rotating said belt by rotatably energizing said wheels, electrically-conductive writing and keying stylii carried by said belt and spaced a fixed distance apart, an electrically-conductive member disposed in the rotating path of said writing stylus and in electrical contact with said writing stylus over a portion of its rotational path, an electrically-conductive member disposed in the rotating path of said keying stylus and in electrical contact with said keying stylus over a portion of its rotational path, and an electrically-conductive contact disposed in the path of said stylii and contactable by said keying stylus in its rotational path, said contact being electrically short-circuited to said member by said keying stylus and said writing stylus being in electrical contact with a predetermined point on said member at the instant of the short circuit and continuing in electrical contact with said member for a period thereafter.

3. A keying and writing apparatus comprising in combination a pair of pulley wheels, an endless belt carried by said wheels, means for energizing one of said pulley wheels to rotate said belt and the other of said pulley wheels, an electrically-conductive carrier for a keying stylus carried by said belt, an electrically-conductive carrier for a writing stylus carried by said belt, said carriers being spaced a predetermined distance apart, a writing and a keying stylus carried by said carriers, respectively, an electrically-conductive rail disposed in the path of said keying carrier, an electrically-conductive rail disposed in the path of said writing carrier, electrically-conductive members disposed in a plane parallel to said keying rail and displaced a predetermined distance therebetween, said writing stylus being electrically connected to said writing rail through said writing carrier over a portion of its rotational path, and said keying stylus electrically connecting said keying rail and said parallel members through said keying carrier over a portion of its rotational path.

4. A keying and writing apparatus comprising in combination a pair of pulley wheels, an endless belt carried by said wheels, an electrically-conductive carrier for a writing stylus carried by said belt, an electrically-conductive carrier for a keying stylus carried by said belt, said writing and keying carriers being spaced a predetermined distance apart, a writing and a keying stylus carried by said carriers, respectively, an electrically-conductive rail disposed in the path of said writing carrier, an electrically-conductive rail disposed in the path of said keying carrier, an electrically-conductive member disposed in a plane parallel to said keying rail, means for energizing one of said pulley wheels to rotate said stylii on said belt and the other of said pulley wheels, said writing carrier electrically connecting said writing rail to said writing stylus over a portion of its rotational path, and said keying stylus electrically connecting said keying rail and said parallel member through said keying carrier over a portion of its rotating path.

5. A keying and writing apparatus comprising in combination a pair of pulley wheels, an endless belt carried by said wheels, means for energizing one of said wheels for rotating said belt and the other of said pulley wheels, an electrically-conductive writing carrier and an electrically-conductive keying carrier carried by said belt, said carriers being spaced a predetermined distance therebetween, a writing stylus and a keying stylus carried by said carriers, respectively, and disposed in opposite directions therebetween, a writing medium disposed in a plane perpendicular to the path of said stylii and in contact with said writing stylus over a portion of its rotational path, an electrically-conductive rail disposed in the path of said keying carrier, an electrically-conductive rail disposed in the path of said writing carrier, an electrically-conductive member disposed in a plane parallel to said keying rail, said writing carrier providing an electrically-conductive path between said writing rail and said writing stylus as said writing stylus is rotated longitudinally across said writing medium, and said keying stylus providing an electrically-conductive path between said electrically-conductive member and said keying rail over a portion of its rotational path.

6. A keying and writing apparatus comprising in combination a pair of pulley wheels, an endless belt carried by said wheels, means for energizing one of said pulley wheels to rotate said belt and the other of said pulley wheels, a pair of electrically-conductive carriers carried by said belt and spaced a predetermined distance apart, an electrically-conductive writing stylus and an electrically-conductive keying stylus each having a looped surface for attachment to each of said carriers, an electrically-conductive rail disposed in the path of said carrier with said writing stylus, an electrically-conductive rail disposed in the path of said keying stylus, an electrically-conductive contact disposed in a plane parallel to said keying rail, a writing medium disposed in the path of said writing stylus, said keying stylus providing an electrically-conductive path between said contact and said keying rail through said carrier attached thereto and said writing stylus being electrically connected to said writing rail and in contact with a predetermined point on said writing medium at the instant of electrical continuity through said keying stylus and remaining in contact with said writing rail and said writing medium for a period thereafter as said writing stylus traverses said writing medium.

7. A keying and writing apparatus comprising in combination a pair of pulley wheels, an endless belt carried by said pulley wheels, means connected to one of said wheels for controlling the distance between said pulley wheels and the tension exerted on said belt, means for energizing one of said pulley wheels to rotate said belt and the other of said pulley wheels, a pair of electrically-conductive carriers carried by said belt and spaced a predetermined distance apart, an electrically-conductive writing stylus and an electrically-conductive keying stylus attached to different one of said carriers, an electrically-conductive rail disposed in the path of said carrier with said keying stylus, an electrically-conductive rail disposed in the path of said carrier with said writing stylus, electrically-conductive contacts disposed in the path of said keying stylus and spaced a predetermined distance therebetween, means for adjusting the position of said contacts in the rotating path of said keying stylus, said keying stylus providing an electrically-conductive path between said contacts and said rail over its rotational path, and said writing stylus being electrically connected to said writing rail through said carrier from the instant of contact of said keying stylus with one of said contacts and for a predetermined period thereafter.

8. In combination, a pair of pulley wheels, an endless belt carried by said wheels, means for rotating said belt by rotatably energizing said wheels, electrically-conductive stylii carried by said belt and spaced a fixed distance apart, an electrically-conductive member disposed in the rotational path of said stylii and in electrical contact with each one of said stylii over a portion of their rotational path, an electrically-conductive contact disposed in the path of one of said stylii over a portion of its rotating path, means connected to said contact for generating sonic energy at predetermined periods of time, means connected to said member and responsive to sonic energy for generating electric current, said contact being electrically short-circuited to said member during the rotational path of one of said stylii for energizing said sonic energy generator, said other stylii being electrically connected to said member at a predetermined position thereon at the instant of said short circuit and for a predetermined period thereafter during its rotational path.

9. In combination, a pair of pulley wheels, an endless belt carried by said wheels, means for rotating said belt by rotatably energizing said wheels, electrically-conductive keying and writing stylii carried by said belt and spaced a fixed distance apart, an electrically-conductive member disposed in the rotating path of said writing stylus and in electrical contact with said writing stylus over a portion of its rotating path, an electrically-conductive member disposed in the rotating path of said keying stylus and in electrical contact with said keying stylus over a portion of its rotating path, an electrically-conductive contact disposed in the rotating path of said keying stylus and contactable by said keying stylus in its rotational path, means connected to said contact for generating sonic energy at predetermined periods of time, means connected to said member in the path of said writing stylus responsive to energization of said sonic energy generator and to return echoes of transmitted sonic energy for generating electric current therefrom, said sonic energy generator being energized by said keying stylus providing electrical continuity between said contact and said keying member, said writing stylus being electrically connected to said writing member and to said sonic energy responsive means from a predetermined point on said writing means at the instant of electrical continuity provided by said keying stylus and for a predetermined period thereafter.

10. In combination, a pair of pulley wheels, an endless belt carried by said wheels, means for rotating said belt by rotatably energizing said wheels, electrically-conductive carriers carried by said belt and spaced a fixed distance apart, a keying stylus and a writing stylus carried by said carriers, respectively, an electrically-conductive member disposed in the rotating path of said writing carrier and in electrical contact with said writing carrier over a portion of its rotating path, an electrically-conductive member disposed in the rotating path of said keying stylus and in electrical contact with said keying carrier over a portion of its rotating path, a plurality of electrically-conductive contacts disposed in the path of said keying stylus and spaced a fixed distance apart, means selectably connected to one of said plurality of contacts at predetermined periods of time for generating sonic energy at predetermined periods of time, means connected to said member in the path of said writing carrier responsive to energization of said sonic energy generator and to return echoes of transmitted sonic energy for generating electric current therefrom, said generator being energized by said keying stylus providing electrical continuity between said one of said contacts and said keying member through said keying carrier, said writing stylus being electrically connected to said writing member and to said sonic energy responsive means for a predetermined period after the instant of electrical continuity provided by said keying stylus.

11. In combination, a pair of pulley wheels, an endless belt carried by said wheels, means for rotating said belt by rotatably energizing said wheels, electrically-conductive keying and writing stylii carried by said belt and spaced a fixed distance apart, an electrically-conductive member disposed in the rotating path of said writing stylus and in electrical contact with said writing stylus over a portion of its rotating path, an electrically-conductive member disposed in the rotating path of said keying stylus and in electrical contact with said keying stylus over a portion of its rotating path, a plurality of electrically-conductive contacts disposed in the rotating path of said keying stylus, said contacts being spaced a predetermined distance apart, and contactable by said keying stylus in its rotational path, means connected to one of said contacts at predetermined periods of time for generating sonic energy at predetermined period of time, means connected to said member in the path of said writing stylus responsive to energization of said generator and to return echoes of transmitted sonic energy for generating electric current therefrom, said generator being energized by said keying stylus providing electric continuity between said one of said contacts and said keying member, said writing stylus being electrically connected to said writing member and to said responsive means from a predetermined point on said writing means at the instant of electrical continuity provided by said keying stylus for one of said contacts and for a predetermined period thereafter, and said keying stylus being electrically connected to said writing member and to said responsive means after a predetermined delay from the instant of electrical continuity for said other of said contacts.

No references cited.